United States Patent
Dolezel et al.

(10) Patent No.: US 10,022,595 B2
(45) Date of Patent: Jul. 17, 2018

(54) GOLF CLUB HEAD CUSTOMIZATION

(71) Applicant: Dunlop Sports Co., Ltd., Hyogo (JP)

(72) Inventors: Keith Dolezel, Covina, CA (US); Dan Nivanh, Tustin, CA (US); Patrick Ripp, Seal Beach, CA (US)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 15/041,755

(22) Filed: Feb. 11, 2016

(65) Prior Publication Data

US 2017/0232309 A1    Aug. 17, 2017

(51) Int. Cl.
*A63B 53/04* (2015.01)
*A63B 53/00* (2015.01)

(52) U.S. Cl.
CPC .............. *A63B 53/00* (2013.01); *A63B 53/04* (2013.01); *A63B 2053/0491* (2013.01)

(58) Field of Classification Search
CPC . A63B 53/00; A63B 53/04; A63B 2053/0491; A63B 24/0003; A63B 53/0466; A63B 69/3632; A63B 2220/833; A63B 2243/0029
See application file for complete search history.

(56) References Cited

U.S. PATENT DOCUMENTS

| | | |
|---|---|---|
| 5,821,417 A | 10/1998 | Naruo et al. |
| 5,857,694 A | 1/1999 | Lazarus et al. |
| 6,015,354 A | 1/2000 | Ahn et al. |
| 6,224,493 B1 | 5/2001 | Lee et al. |
| 6,592,473 B2 | 7/2003 | McDonald et al. |
| 6,616,547 B2 | 9/2003 | Vincent et al. |
| 7,083,530 B2 | 8/2006 | Wahl et al. |
| 7,121,962 B2 | 10/2006 | Reeves |
| 7,153,220 B2 | 12/2006 | Lo |
| 7,159,864 B1 | 1/2007 | Fleury |
| 7,166,041 B2 | 1/2007 | Evans |
| 7,628,711 B2 | 12/2009 | Akinori et al. |
| 7,691,004 B1 | 4/2010 | Lueders |
| 7,731,602 B2 | 6/2010 | Cage |
| 7,771,290 B2 | 8/2010 | Bezilla et al. |
| 7,824,277 B2 * | 11/2010 | Bennett .............. A63B 53/0466 473/328 |
| 7,854,667 B2 | 12/2010 | Gillig |
| 7,959,522 B2 | 6/2011 | North, III et al. |

(Continued)

*Primary Examiner* — Steven Wong
(74) *Attorney, Agent, or Firm* — Stetina Brunda Garred and Brucker; Mark Garred

(57) ABSTRACT

A method of customizing a golf club, wherein the method includes generating operating data representative of a user operating a mechanical device. The operating data is generated by a first sensor sized and configured to be removably positioned in a mounting port formed on the mechanical device during operation of the mechanical device. The sensor is interchangeably positionable in the mounting port with at least one mass insert, the at least one mass insert being adapted to be interchangeably positioned in the mounting to provide at least two different mass configurations. The method further includes determining a recommended configuration of the at least one mass insert specific to the user based on the operating data generated by the sensor, and transmitting information representative of the recommended mass insert.

9 Claims, 7 Drawing Sheets

(56) References Cited

U.S. PATENT DOCUMENTS

| | | |
|---|---|---|
| 7,963,859 B2 | 6/2011 | Cage |
| 7,967,695 B2 | 6/2011 | Voges et al. |
| 7,997,998 B2 | 8/2011 | Bennett et al. |
| 8,025,586 B2 | 9/2011 | Teramoto |
| 8,033,930 B2 | 10/2011 | Tavares et al. |
| 8,133,128 B2 | 3/2012 | Boyd et al. |
| 8,162,776 B2 | 4/2012 | Boyd et al. |
| 8,182,363 B2 | 5/2012 | Bezilla et al. |
| 8,192,302 B2 | 6/2012 | Knutson et al. |
| 8,192,303 B2 | 6/2012 | Ban |
| 8,202,175 B2 | 6/2012 | Ban |
| 8,210,960 B1 | 7/2012 | Davenport |
| 8,221,257 B2 | 7/2012 | Davenport |
| 8,267,812 B1 | 9/2012 | Sery |
| 8,337,335 B2 | 12/2012 | Dugan |
| 8,360,899 B2 | 1/2013 | Swartz et al. |
| 8,371,962 B2 | 2/2013 | Solheim et al. |
| 8,382,604 B2 | 2/2013 | Billings |
| 8,388,465 B2 | 3/2013 | De La Cruz et al. |
| 8,414,411 B2 * | 4/2013 | Stites .................. A63B 69/3614 473/219 |
| 8,430,770 B2 | 4/2013 | Dugan |
| 8,435,135 B2 | 5/2013 | Stites et al. |
| 8,444,509 B2 | 5/2013 | Swartz et al. |
| 8,540,589 B2 | 9/2013 | Bezilla et al. |
| 8,585,512 B1 | 11/2013 | Brady |
| 8,585,514 B2 | 11/2013 | Boyd et al. |
| 8,591,352 B2 * | 11/2013 | Hirano ................ A63B 53/0466 473/336 |
| 8,613,676 B2 | 12/2013 | Bentley |
| 8,616,991 B2 | 12/2013 | Billings |
| 8,636,607 B2 | 1/2014 | Renna |
| 8,657,707 B2 | 2/2014 | Ueda et al. |
| 8,672,782 B2 | 3/2014 | Homsi et al. |
| 8,690,705 B2 | 4/2014 | Molinari |
| 8,702,533 B2 | 4/2014 | Evans |
| 8,734,271 B2 | 5/2014 | Beach et al. |
| 8,834,294 B1 * | 9/2014 | Seluga ................... A63B 53/04 473/338 |
| 9,180,349 B1 * | 11/2015 | Seluga ................... A63B 53/04 |
| 9,216,332 B1 * | 12/2015 | Ehlers .................... A63B 53/06 |
| 9,333,390 B1 * | 5/2016 | Manwaring ........ A63B 24/0003 |
| 2005/0032582 A1 | 2/2005 | Mahajan et al. |
| 2005/0227791 A1 | 10/2005 | McCreary et al. |
| 2007/0049393 A1 | 3/2007 | Gobush |
| 2007/0129178 A1 | 6/2007 | Reeves |
| 2008/0119302 A1 * | 5/2008 | Bennett ................ A63B 53/02 473/335 |
| 2009/0088276 A1 | 4/2009 | Solheim et al. |
| 2009/0120197 A1 | 5/2009 | Golden et al. |
| 2010/0331102 A1 * | 12/2010 | Golden ............... A63B 53/0466 473/337 |
| 2012/0179418 A1 | 7/2012 | Takasugi et al. |
| 2012/0277015 A1 | 11/2012 | Boyd et al. |
| 2012/0289354 A1 | 11/2012 | Cottam et al. |
| 2013/0158928 A1 | 6/2013 | Hogdal |
| 2013/0184091 A1 * | 7/2013 | Rauchholz ............. A63B 53/06 473/198 |
| 2013/0184099 A1 * | 7/2013 | Stites .................... A63B 53/06 473/338 |
| 2013/0267335 A1 | 10/2013 | Boyd et al. |
| 2013/0267336 A1 | 10/2013 | Boyd et al. |
| 2013/0267337 A1 | 10/2013 | Boyd et al. |
| 2013/0267338 A1 | 10/2013 | Boyd et al. |
| 2013/0267339 A1 * | 10/2013 | Boyd .................... A63B 69/36 473/223 |
| 2016/0158598 A1 * | 6/2016 | Dolezel ................. A63B 53/04 473/223 |

* cited by examiner

GOLF CLUB HEAD CUSTOMIZATION

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to golf equipment, and more particularly, customizable golf club equipment.

2. Description of the Related Art

Many sports, such as golf, baseball, tennis, and hockey, require a user to swing an implement for striking a ball or other object. The level of success when participating in such sports oftentimes relates to the user's ability to control the implement with a high degree of precision and accuracy. In this regard, even minor flaws with the user's control over the implement may give rise to adverse results. For instance, when playing golf, if the user's swing results in the clubface being open instead of squaring with the ball at impact, the ball may be sliced. Additionally, or alternatively, the location of the center of gravity is known to affect the trajectory of the ball upon impact. For example, a rearward center of gravity is generally associated with higher dynamic loft and greater moment of inertia as compared with a forward center of gravity. Also, center of gravity location affects spin, gear effect, and sweet spot location. As a result, a center of gravity location that is desirable for one golfer may not be desirable for another.

Recent improvements in technology have enabled customization of golf clubs to better fit the user. In this regard, rather than a "one size fits all" approach, the marketplace now offers different options to suit the needs and characteristics of different consumers. For example, many golf club manufacturers currently offer their customers various fitting applications to improve their equipment selection.

Available customization techniques are, however, still limited in that they tend to require specialized equipment and, in some cases a specialized environment that is solely dedicated to customization, and is not intended for normal use. For instance, the user may swing a specially configured fitting club during a fitting session for purposes of identifying the user's swing characteristics. After the fitting session, the club manufacturer may build a golf club that is customized to the user based on information gathered during the fitting session. The process of building the customized club may take several days or even weeks.

Due to the specially configured customization equipment used during many fitting sessions, as well as the time associated with the customization process, customization tends to be an expensive resource which is typically used only by more serious golfers. Furthermore, the time consuming nature associated with many existing fitting applications is undesirable, as consumers typically have a desire for immediate acquisition of their purchases.

Accordingly, there is a need in the art for an improved customization kit and related methodology, which allows for quick and easy customization of a mechanical device, such as a golf club. Various aspects of the present disclosure address this particular need, as will be discussed in more detail below.

BRIEF SUMMARY

In accordance with one embodiment of the present disclosure, there is provided a method of customizing a golf club, wherein the method includes generating operating data representative of a user operating a mechanical device. The operating data is generated by a first sensor sized and configured to be removably positioned in a mounting port formed on the mechanical device during operation of the mechanical device. The sensor is interchangeably positionable in the mounting port with at least one mass insert, the at least one mass insert being adapted to be interchangeably positioned in the mounting to provide at least two different mass configurations. The method further includes determining a recommended configuration of the at least one mass insert specific to the user based on the operating data generated by the sensor, and transmitting information representative of the recommended mass insert.

The method may further include the step of determining a recommended orientation of a first mass insert of the at least one mass insert on the mechanical device based on the operating data generated by the sensor. The step of determining a recommended orientation may include determining an orientation of the first mass insert on the mechanical device relative to a first axis. The step of determining a recommended orientation may include determining an orientation of the first mass insert on the mechanical device relative to a second axis that is different from the first axis.

The at least two mass insert configurations may include different total insert masses. The at least two possible mass insert configurations may have different mass distributions.

The step of operating the mechanical device may include swinging a golf club. The golf club may be a driver-type golf club. The first sensor may be positionable on the club head and the operating data may additionally be generated by a second sensor located within a shaft of the driver-type golf club. The step of determining the recommended mass insert may be based on a determination of a desired center of gravity location of the club head or club.

According to another embodiment, there is provided a golf club customization system adapted for use with a golf club head having a mounting port formed therein. The golf club customization system includes a sensor insert having a sensor insert body and a sensor coupled to the sensor insert body. The sensor insert body is sized and configured to be removably insertable within the mounting port formed in the club head. The sensor is further configured to generate operating data representative of a user swinging the club head. The customization system further includes at least two mass inserts, each mass insert being sized and configured to be insertable in the mounting port formed in the club head to modify the physical characteristics of the club head. A selector is in operative communication with the sensor, with the selector being configured to select one of the at least two mass inserts based on the operating data generated by the sensor.

The system may further include a display in operative communication with the selector and configured to display information associated with the selected one of the at least two mass inserts. The display may be a mobile communication device.

Each mass insert may include a mass body and a resilient cover extending over the mass body. Each mass insert may have an elongate generally cylindrical configuration. Each mass insert may include fastening elements formed at opposed ends of the respective mass insert to enable insertion of the respective mass insert into the mounting port in at least two different orientations. The system may further include a fastener configured to be engageable with the fastening elements of the mass inserts and the club head for securing the mass inserts individually within the club head.

The at least two mass inserts may be of different masses. The at least two mass inserts may also have different mass distributions.

The selector may be configured to select one of the at least two mass inserts based on a desired center of gravity of the club head.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of a golf club customization system and related method, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
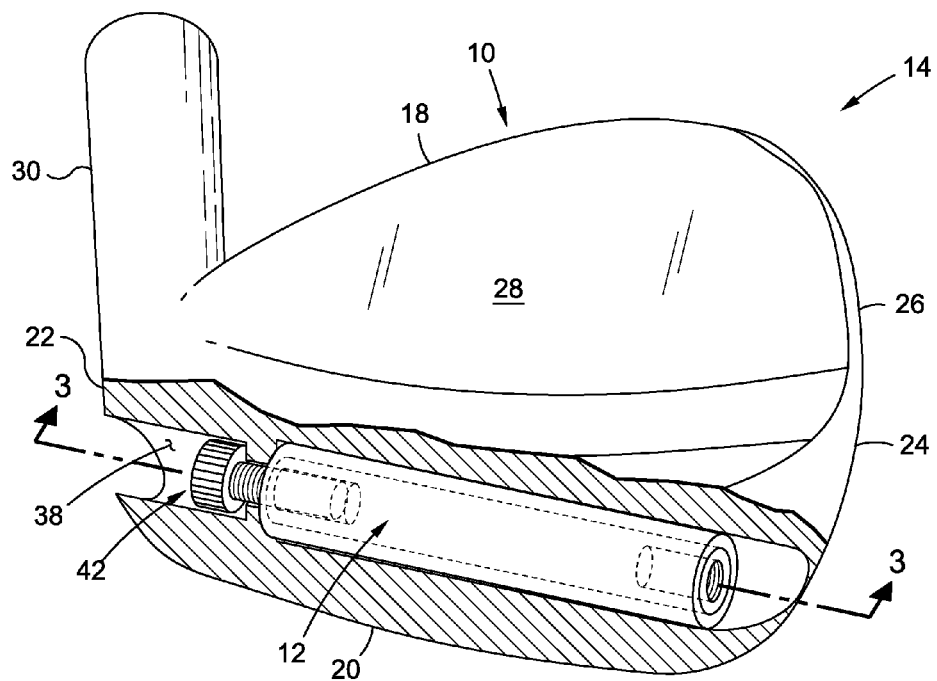
FIG. 1 is a partial sectional, rear perspective view of a club head and an insert positioned within a mounting port in the club head according to an embodiment of the present disclosure.

Referring now to FIG. 1, there is depicted a customizable club head 10 adapted for use with any one of a plurality of differently configured inserts 12 as described with greater particularity below, such inserts 12 being specifically configured and adapted to enable a user to sense the user's swing characteristics and then modify the physical properties of the club head 10 based on the user's swing characteristics to optimize the user's swing. In some embodiments the plurality of inserts 12 may sold as a kit of inserts, optionally sold in conjunction with the golf club head 10 (optionally in conjunction with a conventional shaft, as sold as a golf club). In other embodiments, the user may test a golf club at a retail establishment, simulated golf course, or actual golf course, and select and purchase a single (or plural) inserts 12 from a wider made-available portfolio of inserts. The inserts 12 may be easily swapped and interchanged with each other to customize the club-head 10 on-the-fly. In this regard, customization of the club head 10 does not require specialized fitting equipment which is not suitable for use during play on the golf course, nor does the customization require an extended period of time to complete the customization. Rather, the same equipment, i.e., the club head 10, used during the customization may also be used during normal play as being compliant with the rules of golf as may be set forth by one or more governing bodies (e.g., the United States Golf Association (USGA)).

Figure 2:
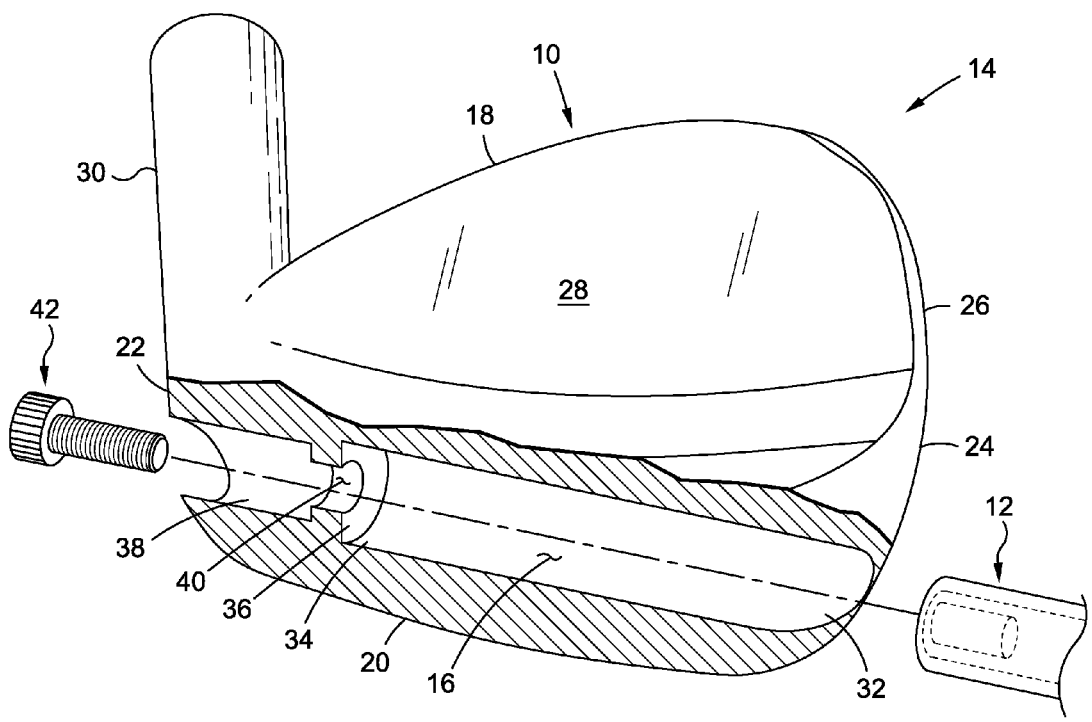
FIG. 2 is a partial sectional, rear perspective view of a club head similar to FIG. 1, but depicting the insert as removed from the club head.

As described above, in some embodiments, the club head 10 and at least one insert 12 form a customization kit 14, although as will be described in more detail below, the customization kit 14 preferably includes at least one sensing insert and at least one mass insert adapted to be removably positioned within a mounting port 16 formed in the golf club head 10. The golf club head 10 shown in FIGS. 1 and 2 is an iron-type golf club head including a topline 18, a sole 20 in generally opposed relation to the topline 18, a heel portion 22, and a toe portion 24 in generally opposed relation to the heel portion 22. In some embodiments, the club head 10 is preferably a higher lofted iron-type club head, e.g. having a loft no less than 40°, and even more preferably a wedge-type club head. A striking face 26 is disposed on one side of the club head 10 and extends in one direction between the topline 18 and the sole 20, and in another direction between the heel portion 22 and the toe portion 24. The striking face 26 may be textured to create desired spin characteristics on the golf ball when the striking face 26 impacts the golf ball. A rear surface 28 is in generally opposed relation to the striking face 26. The club head 10 further includes a hosel 30 extending from the heel portion 22 of the club head 10 and adapted to be connectable to a golf club shaft using attachment techniques known by those skilled in the art.

The mounting port 16 shown in FIGS. 1-8 and 11 is preferably cylindrically configured and includes an exposed first end portion 32 at the toe portion 24 and a second end portion 34 located within the club head 10 and spaced from the toe portion 24. In the exemplary embodiment, the mounting port 16 is located within the sole 20, is spaced from the striking face 26 and the rear face 28, and extends in a generally heel-to-toe direction. More preferably, particularly in the case of the club head being a wedge-type club head, the mounting port 16 is preferable located at least partially within a muscle portion and, in some cases, entirely within a muscle portion. In alternative embodiments, the mounting port extends in the top to sole direction optionally in direction parallel to a general plane of the striking face. An internal wall 36 extends between the second end portion 34 of the mounting port 16 and a fastening port 38, which in turn, extends from the internal wall 36 to an outer surface of the club head 10 at the heel portion 22 thereof. The fastening port 38, which also preferably has a cylindrical configuration, is coaxially aligned with the mounting port 16. Along these lines, the internal wall 36 includes a central aperture 40 which places the fastening port 38 in communication with the mounting port 16. A fastener 42 is insertable within the fastening port 38 and is capable of extending through the aperture 40 to engage with an insert 12 located within the mounting port 16 for securing the insert 12 therein, as will be described in more detail below.

The inserts 12 are configured to be removably insertable within the mounting port 16 for purposes of swing characteristic analysis, as well as to provide customizable mass distribution to the club head 10 to optimize club head properties given the user's swing. In this regard, as indicated above, the customization kit 14 may include a plurality of inserts 12, which are adapted to serve different purposes, with such inserts 12 including, for example, a sensor insert 12a and one or more mass inserts 12b. It is contemplated that each of the inserts 12 will have a shape which is complementary to that of the mounting port 16, e.g., a generally cylindrical configuration, which is of an outer diameter (OD) sized relative to the inner diameter (ID) of the mounting port 16 such that any insert 12 may slidably advanced into and be removed from within the mounting port 16 without an excessive amount of clearance between the OD and the ID.

Figure 3:
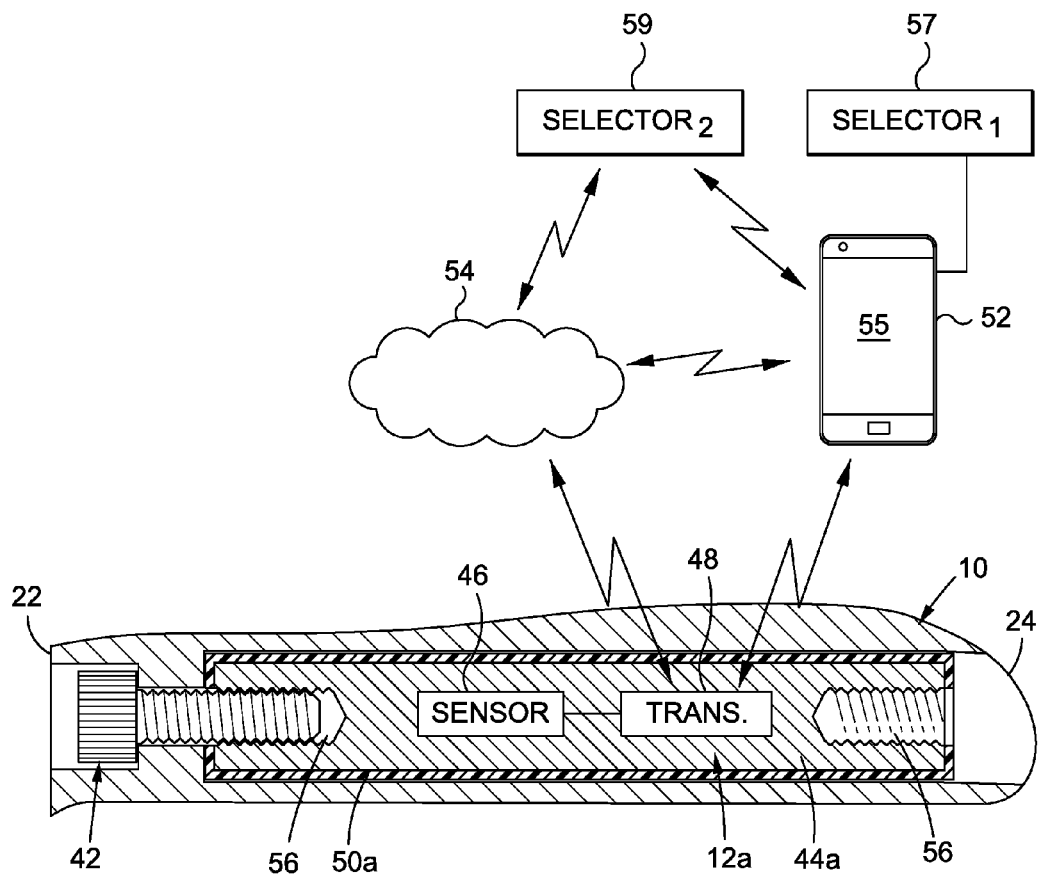
FIG. 3 is a schematic overview of a customization system using the club head and insert shown in FIGS. 1 and 2.

Referring now specifically to FIG. 3, there is depicted a club head 10 having a sensor insert 12a (as a species of an insert 12) inserted within the mounting port 16. The sensor insert 12a includes an insert body 44a, along with a sensor 46 and a transceiver 48 coupled to the insert body 44a. A battery or other power source (now shown) may be included in the sensor insert 12a for providing power to the sensor 46 and the transceiver 48. The battery source may include a generative power source such as a solar-powered cell or piezo-electric material, which may generate current upon impact and optionally search such voltage generation. The sensor 46 is adapted to detect characteristics associated with the user's swing, including the swing path, swing speed, swing acceleration, attack angle, etc. Accordingly, the sensor 46 may include one or more of the following: an accelerometer, a gyroscope, a position sensor (e.g., a GPS module), or other sensing devices known in the art. The sensor 46 is preferably embedded within the insert body 44a to protect the sensor 46 from inadvertent impacts. An outer surface of the insert body 44a is preferably covered with a protective cover 50a formed of a resilient material, such as a soft polymer. The protective cover 50a is adapted to protect the insert body 44a from contacting the club head 10 when the user swings the club head 10 and impacts a golf ball. In this respect, it is understood that the club head 10 will vibrate upon impact with the golf ball, and the protective cover 50a dampens the vibrations which are imparted by the club head 10 to the insert body 44a. The protective cover 50a may be molded onto the outer surface of the insert body 44a. Although the foregoing describes the sensor insert 12a as including a protective cover 50a extending around the insert body 44a, it is also contemplated that a protective liner may be applied to the club head 10 within the mounting port 16 to provide a protective layer between the club head and the insert body 44a to facilitate the aforementioned impact protection attributes. Additionally, the protective cover 50a is adapted to provide for a snug fit between the insert 12a and the club head 10. Accordingly, manufacturing tolerances may be appropriately accounted for, and any vibrations or movement of the insert 12a based on impact may be minimized.

The transceiver 48 is in operative communication with the sensor 46 and is adapted to enable communication between the sensor 46 and a remote electronic device 52, such as a smartphone, tablet computer, laptop computer, other general purpose computer(s), cloud-based data storage 54, etc., for instance, to enable analysis or storage of the data generated by the sensor 46. The transceiver 48 is preferably configured to enable wireless communication the remote electronic device 52, although it is contemplated that wired communication may also occur between the transceiver 48 and the remote electronic device 52. The wireless communication between the transceiver 48 and the remote electronic device 52 may occur via common wireless communication protocols known in the art such as BLUETOOTH, WiFi, Infrared, or the like. Data generated by the sensor 46 is communicated to the remote electronic device 52 or cloud-based data storage 54 for analysis by a selector configured to determine an optimal mass insert 12b and/or mass insert orientation/configuration based on the data. The selector may include Selector1 57 stored locally in the remote electronic device 52 or Selector2 59 accessible by the remote electronic device 52 or data storage 54.

The sensor insert 12a is adapted to engage with the fastener 42 inserted within the fastening port 38 for securing the sensor insert 12a within the club head 10. In this respect, the sensor insert 12a includes one or more threaded openings 56 extending axially therein and adapted to engage with corresponding threads formed on the fastener 42. As shown in FIG. 3, the sensor insert 12a includes threaded openings 56 formed on opposed ends of the insert 12a to enable the sensor insert 12a to be positioned within mounting port 16 in at least two different configurations. In particular, when the sensor insert 12a is in a first configuration, a first one of the threaded openings 56 is engageable with the fastener 42, and when the sensor insert 12a is in a second configuration, a second one of the threaded openings 56 is engageable with the fastener 42. Switching the sensor insert 12a between the first and second configurations may change the physical characteristics of the club head 10, such as changing the center of gravity, or may allow for data to be sensed from a different reference point if the sensor 46 is offset from a centerline of the insert 12a for a more comprehensive data analysis. In alternative embodiments, the insert 12a abuts a club head surface having projections and/or recesses complementary to the abutting surface of the insert 12a, e.g. an anti-rotation feature. In the manner, upon insertion and axial compression, the insert 12a is inhibited from rotation about its longitudinal axis. Furthermore, having such an anti-rotation feature enables orienting the insert 12a in only a single orientation, which may be beneficial where rotational position affects the mass distribution and/or other performance-related characteristics of the club head.

Referring now to FIGS. 4-8, any one of a plurality of differently configured mass inserts 12b, further labeled with particularity as 12b1, 12b2, 12b3, 12b4 and 12b5 in respective ones of FIGS. 4-8, are also configured to be individually placed within the mounting port 16 to selectively alter the physical characteristics of the club head 10. The mass inserts 12b1-12b5 each include a mass insert body 44b and a cover 50b over the mass insert body 44b. The cover 50b is similar to the cover 50a, and in one embodiment, both covers 50a, 50b may be formed from a material having a Shore hardness of approximately 40 D. The mass insert bodies 44b of the mass inserts 12b1-12b5 may differ to offer alternative mass configurations for the user. In this regard, the mass insert bodies 44b may have different physical characteristics, such as different material properties and/or different structural properties. The material properties are associated with the density, weight, etc. of the material used to form the respective mass insert bodies 44b. Exemplary materials include steel, tungsten or other materials known in the art. The structural properties are associated with the physical configuration of any particular mass insert body 44b, including the size and/or number of cutouts 58 associated therewith.

Figure 4:
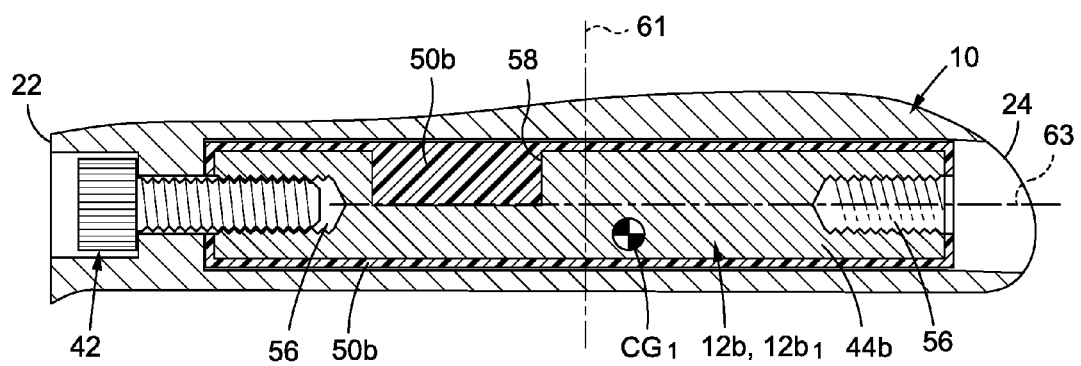
FIGS. 4-8 are cross-sectional views showing different mass inserts positioned within the mounting port of the club head shown in FIGS. 1 and 2.

As is apparent from FIGS. 4-8, the primary distinctions between the mass inserts 12b1-12b5 reside in the different structural properties associated with each corresponding mass insert body 44b. For instance, FIG. 4 shows the mass insert body 44b of the mass insert 12b1 as including a single cutout 58 offset slightly from a transverse centerline 61 of such mass insert body 44b, which results in a center of gravity CG1 spaced from both the transverse centerline 61 and the longitudinal centerline 63, and positioned closer to the toe portion 24 than the heel portion 22 when the mass insert 12b1 is slidably advanced into the mounting port 16 and secured therein.

Figure 5:
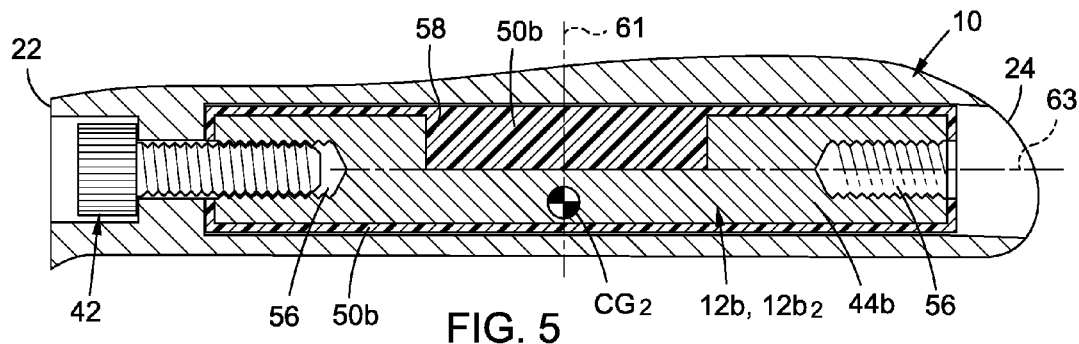

FIG. 5 shows mass insert body 44b of the mass insert 12b2 as also including a single cutout 58, although the cutout 58 of the mass insert 12b2 shown in FIG. 5 is larger than the cutout 58 of the mass insert 12b1 shown in FIG. 4. Furthermore, the cutout 58 of the mass insert 12b2 shown in FIG. 5 is substantially symmetrical about the transverse centerline 61 of the corresponding insert body 44b, which results in a center of gravity CG2 located on the transverse centerline 61, but spaced from the longitudinal centerline 63 in the mass insert 12b2. Similar to the insert body 44a of the sensor insert 12a, the mass insert bodies 44b of the mass inserts 12b1, 12b2 shown in FIGS. 4 and 5 each include a pair of internally threaded openings 56 formed and extending axially within respective ones of the opposed ends thereof, each of these openings 56 being adapted to engage the fastener 42 for purposes of effectively securing the corresponding mass insert 12b1, 12b2 within the mounting port 16.

Figure 6:
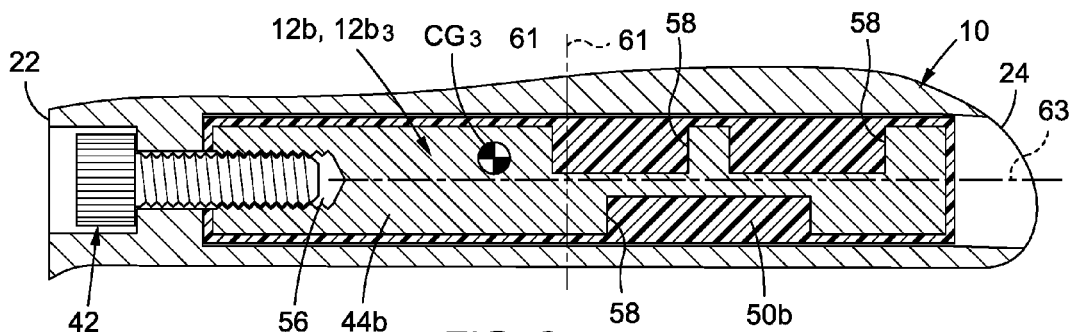

The mass insert body 44b of the mass insert 12b3 shown in FIG. 6 includes cutouts 58 extending from diametrically opposed sides of such mass insert body 44b, with one side including two cutouts 58, and the other side only including one cutout 58 comparatively longer than each of the other two cutouts 58. The configuration of the mass insert 12b3 shown in FIG. 6 results in a center of gravity CG3 that is spaced from both the transverse and longitudinal centerlines 61, 63 and positioned closer to the heel portion 22.

Figure 7:
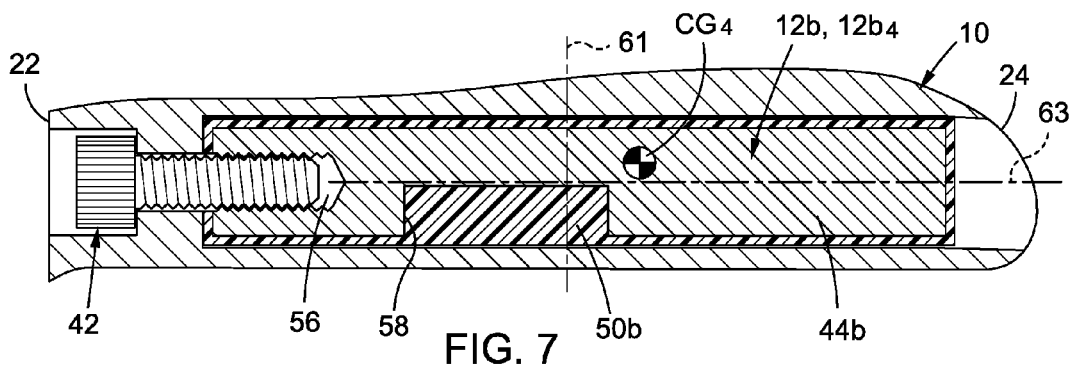
Figure 8:
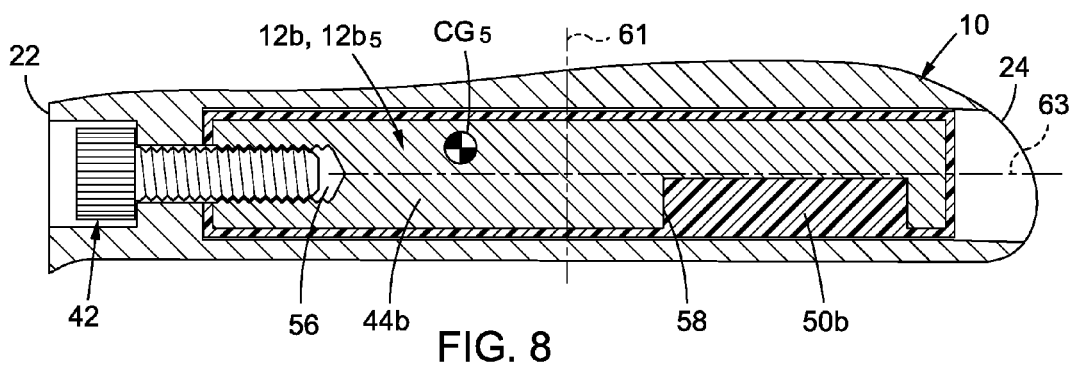

The mass insert bodies 44b of the mass inserts 12b4, 12b5 shown in respective ones of FIGS. 7 and 8 each include only one cutout 58, with the cutouts 58 of the mass inserts 12b4, 12b5 differing in size and location on the respective mass insert bodies 44b. In greater detail, the mass insert body 44b of the mass insert 12b4 shown in FIG. 7 defines a center of gravity CG4 that is spaced from both the transverse and longitudinal centerlines 61, 63 and is closer to the toe portion 24 when the mass insert 12b4 is slidably advanced into the mounting port 16 and secured therein. In contrast, the mass insert body 44b of the mass insert 12b5 shown in FIG. 8 defines a center of gravity CG5 also spaced from both centerlines 61, 63 and positioned closer to the heel portion 22 when the mass insert 12b5 is slidably advanced into the mounting port 16 and secured therein.

As is also apparent from FIG. 6-8, in the mass inserts 12b3, 12b4, 12b5, the corresponding mass insert bodies 44b each include only a single internally threaded opening 56 extending axially within one of the opposed ends thereof and adapted to engage with fastener 42. This differs from the mass insert bodies 44b of the mass inserts 12b1, 12b2, 12b3 shown in FIGS. 4 and 5 which include an opposed pair of threaded openings 56 as indicated above.

The various mass inserts 12b1-12b5 having corresponding different mass insert bodies 44b may be swapped or interchanged with each other to alter the physical characteristics of the club head 10. For instance, swapping the mass inserts 12b1-12b5 may allow for alteration of club head mass, club head center of gravity, club head mass distribution, etc., which suits the particular swing characteristics of the golfer.

With the basic structural features of the customization kit 14 described above, the following discussion will focus on an exemplary use thereof. Customization of the club head 10 generally includes three phases: a data gathering phase, a data analysis phase, and a club configuration phase. The data gathering phase includes placing the sensor insert 12a into the mounting port 16 of the club head 10 and securing the sensor insert 12a to the club head 10 using the fastener 42. The sensor insert 12a may need to be powered on by actuating a button or switch prior to insertion of the sensor insert 12a into the club head 10. Once the sensor insert 12a is powered on and placed within the mounting port 16, the user swings the golf club. During the swing, the sensor 46 detects one or more characteristics of the swing path and generates sensor data related thereto. For instance, the sensor 46 may detect, extract, measure or otherwise calculate user-specific swing attributes, such as an attack angle, swing speed, etc. Multiple swings may be measured and the sensor 46 may calculate averages of the measured swing characteristics. It is contemplated that after swinging the golf club, the user may change the position of the sensor 46 within the club head 10 either by rotating or flipping the sensor insert 12a relative to the club head 10 to obtain data from another reference position.

The data analysis phase includes analyzing the sensor data generated by the sensor 46. Such data analysis is typically performed by a selector 57, 59 associated with a remote computing device 52, and thus, the sensor data is typically communicated from the sensor insert 12a to the remote computing device 52 using the transceiver 48 on the sensor insert 12a. In this respect, the transceiver 48 may be configured to automatically transmit the sensor data once the data is generated, or alternatively, the sensor data may be stored in a temporary data storage module (not shown) on the sensor insert 12a until it is transmitted by the transceiver 48. In another embodiment, the transceiver 48 transmits the sensor data in response to receiving a request from the remote computing device 52.

The sensor data is analyzed by the selector 57, 59 associated with the remote computing device 52 to determine which mass insert 12b, such as which one of the mass inserts 12b1-12b5, should be used based on the user's swing characteristics. In this respect, the selector 57, 59 may employ algorithms known in the art for analyzing the sensor data to make such a determination. According to one embodiment the algorithms are associated with software stored on a computer-readable medium in the form of computer-readable instructions. A computer may read those computer-readable instructions, and in response, perform various steps as defined by those computer-readable instructions. Thus, any functions attributed to any of the functional blocks of FIG. 9 as described herein may be implemented, for example, by reading and executing such computer-readable instructions for performing those functions, and/or by any hardware subsystem (e.g., a processor) from which the computer is composed.

The selector 57, 59 may also use the sensor data to determine a preferred orientation of the mass insert 12$b$ within the mounting port 16 based on the user's swing characteristics. In this respect, the mass insert 12$b$ may be rotatable about at least two axes 61, 63 to arrange the mass insert 12$b$ within the mounting port 16 in several different orientations. For instance, with regard to the mass insert 12$b$1 shown in FIG. 4, rotating the mass insert 12$b$1 about the longitudinal axis 63 may move CG1 in a vertical direction relative to the perspective shown in FIG. 4 to alter the position of CG1 relative to longitudinal axis 63. The mass insert 12$b$1 may be rotated incrementally about the longitudinal axis 63 to allow for a wide range of positional adjustability of CG1. Furthermore, rotating the mass insert 12$b$1 about transverse axis 61 switches the position of CG1 relative to the transverse axis 61 (i.e., flipping the orientation of the insert 12$b$1 would place CG1 closer to the heel 22).

The determination of which mass insert 12$b$ to use, as well as the orientation of the mass insert 12$b$ within the mounting port 16, may be determined using a predetermined equation or relationship wherein the sensor data is an input to the equation, and the determined mass insert 12$b$ and orientation is the output. Alternatively, a stored look-up table or database may be used to determine the preferred mass insert 12$b$ or orientation based on the sensor data.

Once the remote computing device 52 analyzes the sensor data and determines a preferred mass insert 12$b$ as well as a preferred orientation of the mass insert 12$b$ within the mounting port 16, the remote computing device 52 displays the preferred mass insert 12$b$ and preferred orientation on a display device, which may include the display screen 55 associated with the remote computing device 52 (e.g., the touch screen display on a smartphone) or a display screen separate from the remote computing device 52. For instance, the remote computing device 52 may include a server accessible by the user through a website, and the mass insert 12$b$ and corresponding orientation information may be displayed on a display screen 55 separate from the server, such as the display screen of the computing device on which the user is accessing the server. After the information is displayed, the user may place the preferred mass insert 12$b$ within the mounting port 16 of the club head 10 in the preferred orientation and secure the mass insert 12$b$ to the club head using the fastener 42.

The interchangeability of the sensor insert 12$a$ and the mass inserts 12$b$ within the mounting port 16 allows the user to quickly and easily analyze the user's swing characteristics and customize the club head 10. For instance, if the user is displeased after playing a round of golf, the user can customize the club head 10 before the next round, to fine tune the user's swing, and to provide additional confidence to the golfer.

Figure 9:
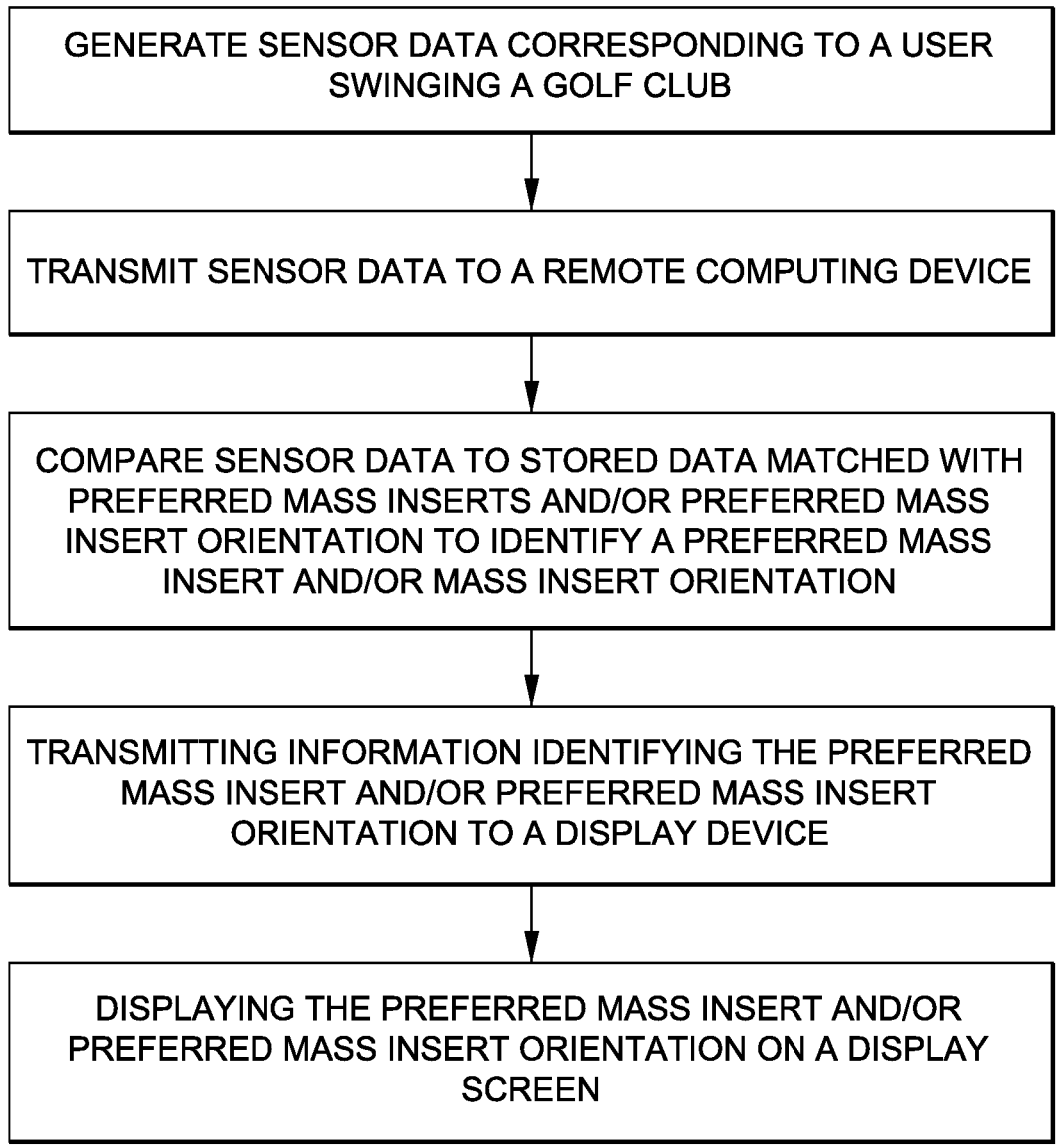
FIG. 9 is a flowchart describing an exemplary methodology of customizing a club head using any of the inserts shown in FIGS. 1-8.
Figure 10:
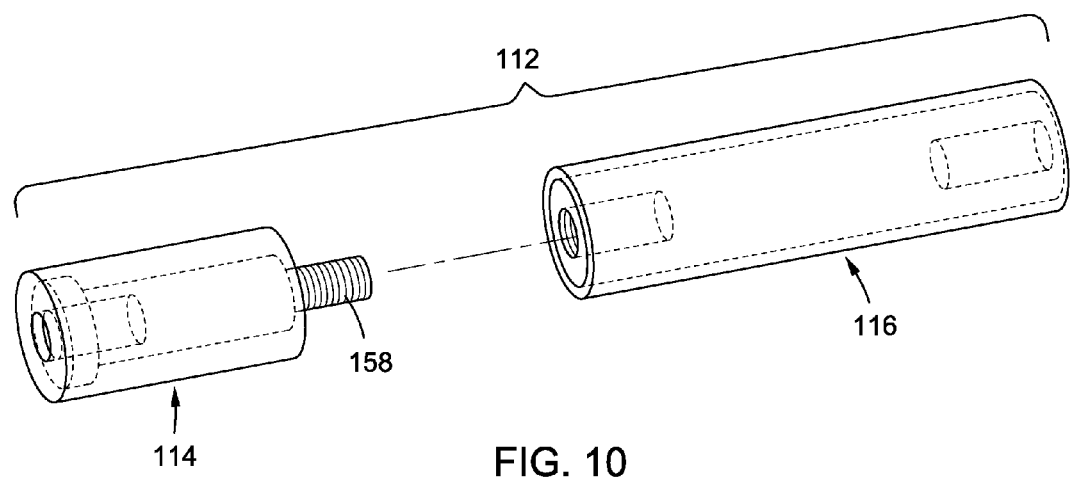
FIG. 10 is an upper perspective view of another embodiment of an insert configured for use with the club head and suitable for the customization method described in FIG. 9.
Figure 11:
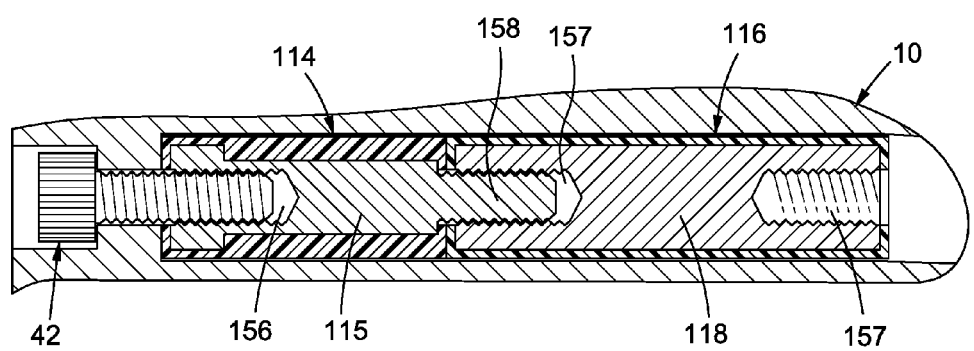
FIG. 11 is a cross-sectional view of the insert shown in FIG. 10 positioned within the mounting port of the club head.

FIGS. 9 and 10 show another embodiment of a mass insert 112 having two detachably engageable components. In particular, the insert 112 includes a first component 114 adapted to engage with the fastener 42 and an interchangeable second component 116. In other words, rather than swapping out the entire insert 112 for another insert 112, similar to the substitution technique described above in relation to mass inserts 12$b$, the second component 116 may be changed to alter the physical characteristics of the mass insert 112. In this respect, several second components 116 may be used with a single first component 112 to vary the physical characteristics of the mass insert 112.

The first component 114 includes a first component body 115 having an internally threaded opening 156 adapted to engage with the threaded shaft of the fastener 42. Opposite the threaded opening 156 is a threaded shaft 158 for connecting the first component 114 to the second component 116. The second component 116 includes a mass insert body 118 having one or more threaded openings 157 cooperatively engageable with the threaded shaft 158. The mass insert body 118 is formed without any cutouts, although it is understood that the mass insert body 118 may also include one or more cutouts to define a unique physical configuration. Both the first and second components 114, 116 may include resilient covers 150, 151 extending over their respective bodies 115, 118.

The customization described herein includes placing mass inserts within a mounting port formed within the sole of the club head 10. It is understood that the sensor insert 12$a$ and/or mass insert 12$b$ may be attached to other locations on the club head 10. For instance, the inserts 12 may be configured to be coupled to the rear surface 28 and/or to an external surface of the sole 20, which may be particularly useful for altering the bounce associated with club head 10. In this respect, one insert 12 may be associated with a club head having a low bounce, while another insert 12 may be associated with a club head having a high bounce. For more information, please refer to U.S. patent application Ser. No. 14/876,731, entitled Adjustable Club Head, the contents of which are expressly incorporated herein by reference.

Although the foregoing describes club head customization using a sensor located in the club head, in other embodiments, a more comprehensive golf club customization may be achieved by using an additional sensor in the shaft of the golf club. The use of two sensors, with one being in the club head and the other being in the shaft may allow for the additional detection of shaft flex or deflection during the swing. Consequently, the remote computing device may be able to make a determination as to a preferred shaft associated with a preferred shaft stiffness based on the data gathered by the two sensors.

Furthermore, it is also contemplated that the customization kit is not limited to iron-type club heads, but may also encompass putter-type club heads, hybrid-type club heads, drivers or other wood-type club heads. The customization kit for the wood-type club heads is similar to the customization kit for the iron-type club heads discussed above, and generally includes a customizable club head having a mounting port formed thereon, as well as a sensor insert and at least one mass insert. The mounting port and corresponding inserts may be configured similarly to the mounting port 16 and inserts 12 described above, although, given the larger volume typically associated with wood-type club heads, it is contemplated that the mounting port and corresponding inserts may have different configurations. For instance, in one embodiment, instead of defining a circular cross sectional configuration, the mounting port and corresponding inserts may define a non-circular cross-sectional shape, e.g. a regular polygonal shape or an irregular geometric shape. In some embodiments, the insert defines a prismatic shape having a triangular cross sectional configuration.

Figure 12:
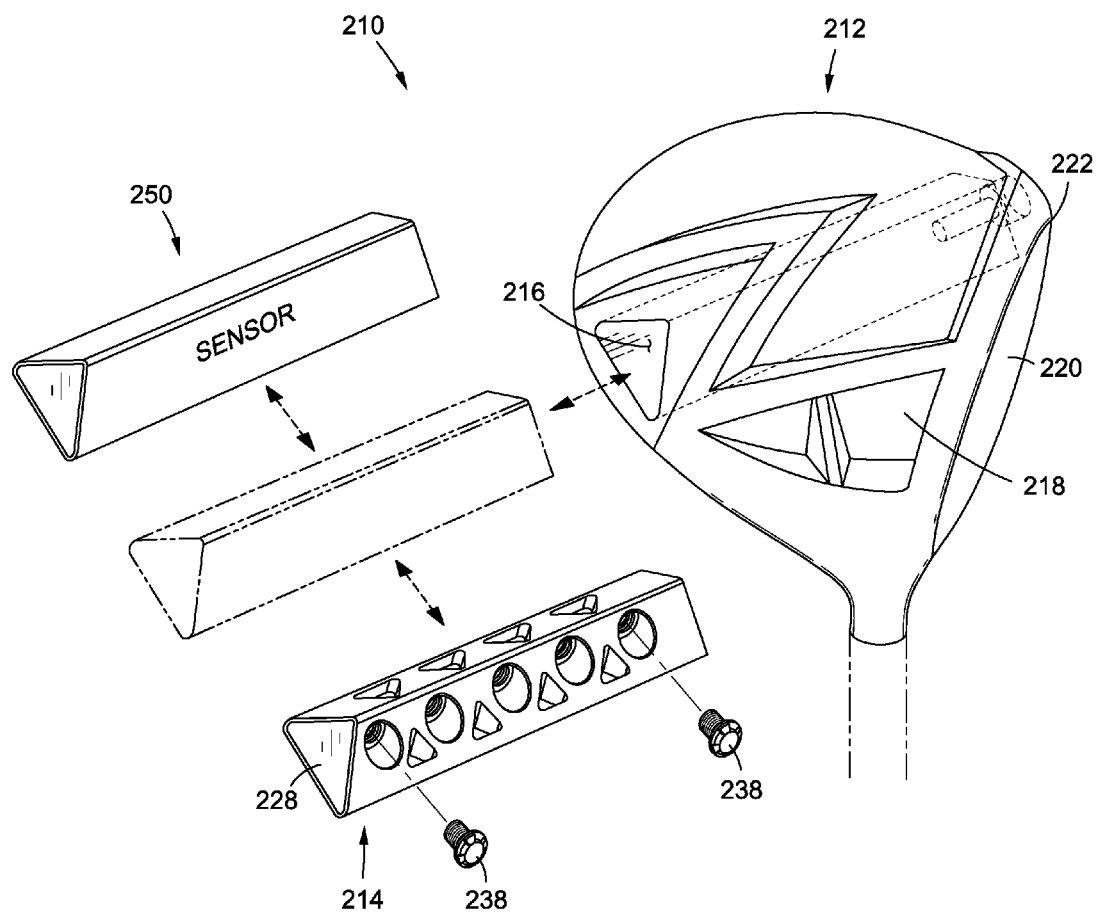
FIG. 12 is a perspective view of a configuration kit that includes a wood-type club head, a sensor element, and a prismatic insert adapted to be inserted into a mounting port formed in the wood-type club head.
Figure 13:
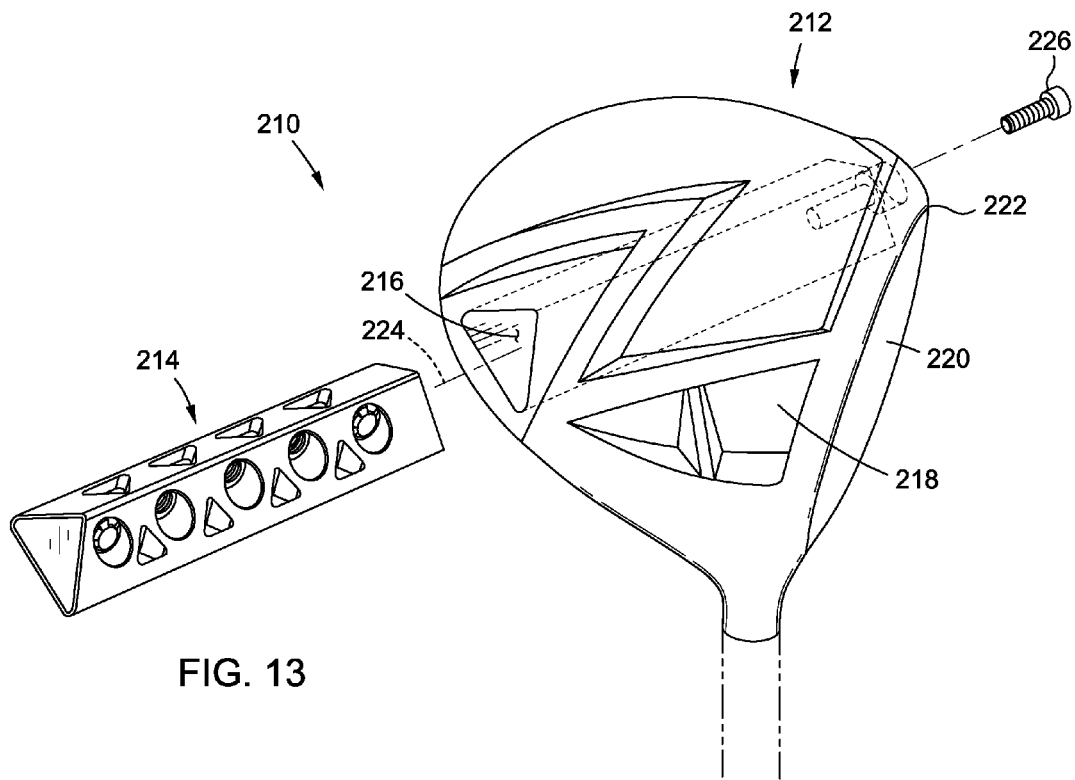
FIG. 13 is a perspective view of a configuration kit that include a wood-type club head and a prismatic insert adapted to be inserted into a mounting port formed in the wood-type club head.
Figure 14:
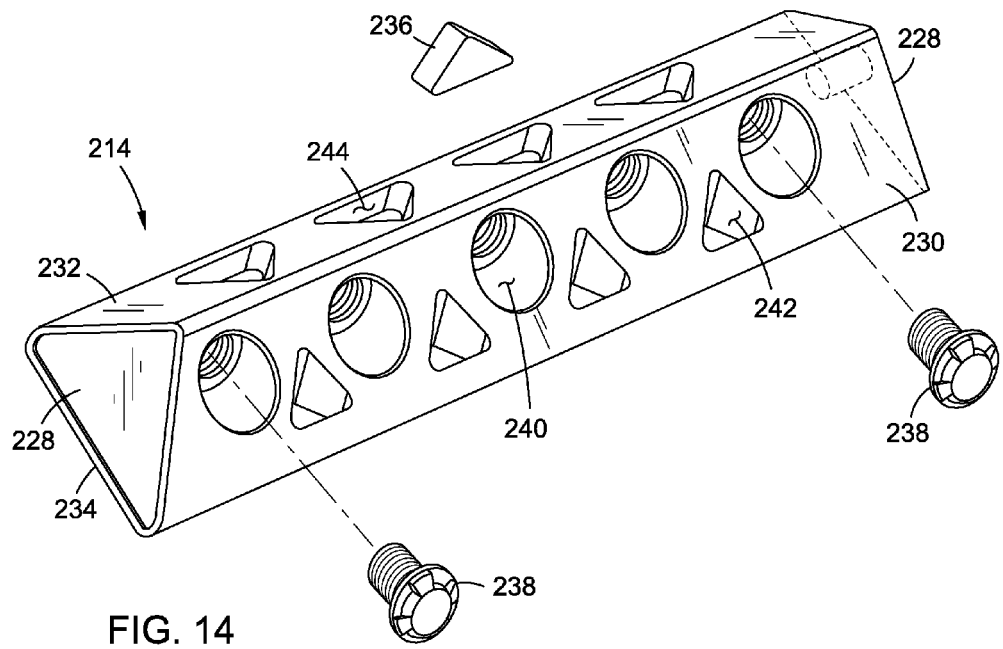
FIG. 14 is a perspective view of the prismatic insert shown in FIG. 12, with a weight and a sensor being exploded from the prismatic insert.

Along those lines, and referring now specifically to FIGS. 12 and 13, there is depicted a customization kit 210 adapted for a wood-type club head 212 specifically configured to receive a prismatic insert 214 into a mounting port 216 formed in the club head 212. In some embodiments, as shown in FIG. 12, the customization kit 210 also includes a sensor element 250. The sensor element 250 includes one or more active electronic or non-electronic sensor devices similar to those described above with regard to the embodiments shown in FIGS. 1-11. The sensor element 250 also preferably includes a housing for stably positioning the sensor device or devices within the mounting port 216 of the club head 212. Preferably, the sensor element 250 may be docked within the mounting port 216 interchangeably with the insert 214. In some such cases, preferably, the club head 212 is configured such that only one of the insert 214 and the sensor element 250 is associated therewith. This configuration may provide for dedicating minimal structural mass to the construction of the customization kit 210, thereby freeing up budgetary mass for discretionary placement for optimizing the mass characteristics of the club head 212. However other configurations are possible, e.g. a golf club head configuration in which one or both of the insert 214 and sensor element 250 are docked with the club head 212 simultaneously (e.g. by way of a mounting port with plural docks).

It is preferable that the sensor element 250 is removable and interchangeable with another insert, e.g., insert 214, preferably a non-electronically active insert. Some organizations that serve as governing bodies for the regulation of equipment in professional golf, e.g. the United States Golf Association ("USGA"), generally do not permit active electronics and/or sensory devices to be used in conjunction with playing equipment. By configuring the kit 210 such that the sensor element 250 is removable and/or replaceable, the golf club 212 necessarily includes a state in which it conforms to these regulations. Thus, this removability and, preferably, interchangeability, provides for a more useful product to offer potential consumers.

Preferably, the sensor 250 is capable of measuring the orientation and/or the location of the club head during various points of a golfer's swing in similar manner as with the sensor described with regard to the embodiments shown in FIGS. 1-11. Further, the sensor information is preferably transmitted in like manner as in the process described with regard to the FIG. 9. By using stored look-up tables, algorithms or other stored predetermined relationship between measured sensor data and values representative of optimal recommendations, the sensor preferably calculates an optimal recommendation for the configuration of the club head 212 and outputs such recommendation based on the sensor data. Preferably, the recommendation includes a setting of the insert 214, e.g. how many weight inserts 238 (and/or the location or orientation thereof) to secure to the insert 214.

From the perspective shown in FIG. 13, a sole 218 of the club head 212 is shown, with the mounting port 216 extending through the sole 218 and having one end located adjacent the striking face 220 at a toe portion 222 of the club head 212, and another end located at the rear, middle portion of the club head 212. In this regard, the mounting port 216 preferably extends along a mounting port axis 224, which passes through a wide section of the club head 212 in a front-to-rear direction. Furthermore, in the exemplary embodiment, the mounting port axis 224 does not pass through the striking face 220, and is angularly offset from a striking face plane, although it is understood that in other embodiments, the mounting port axis 224 may intersect the striking face 220, and optionally may be generally perpendicular to the striking face plane. The configuration of the mounting port 216 is complementary to the insert 214, and due to the prismatic configuration of the insert 214, the mounting port 216 also defines a prismatic configuration. The prismatic shape of the insert 214 and corresponding mounting port 216 inhibit rotation of the insert 214 when it is received within the mounting port 216. Furthermore, the insert 214 may include a polymer/resilient coating to protect the insert 214 and to form a snug fit between the insert 214 and mounting port 216 about the insert 214, thereby reduce vibration of the insert 214 when the club head 212 strikes a golf ball. When the prismatic insert 214 is placed in the mounting port 216, a fastener 226 is used to secure the prismatic insert 214 therein.

Turning now to FIG. 13, an enlarged view of the prismatic insert 214 is shown and includes a pair of triangular end walls 228 and three side walls 230, 232, 234 extending between the triangular end walls 228. At least one, and preferably all three side walls 230, 232, 234 includes a plurality of openings or recesses formed therein, with each recess being adapted to accommodate a sensor element 236 and/or a weight element 238. In the exemplary embodiment, the prismatic insert 214 includes five circular recesses 240 formed in a first side wall 230, with each circular recess 240 being configured to receive a weight element 238. Furthermore, four triangular recesses 242 are formed in the first side wall 230 and are adapted to receive corresponding triangular shaped sensor elements. A second side wall 232 includes four triangular recesses 244 adapted to receive triangular shaped elements, which, in these particular embodiments, may be sensor elements or weight elements. The third sidewall 234 may also include one or more recesses configured to receive sensor or weight elements. Two weight elements 238 are shown in FIG. 13, exploded from corresponding circular recesses 240. Each weight element 238 includes a threaded shaft which engages with cooperating threads formed in the circular recess 240.

The weight and sensor elements 238, 236 are used in a similar manner described above in relation to customizing the iron-type club heads, i.e., the sensor(s) may be used to measure characteristics related to the user's swing and the weights may be added to the insert to customize the club head to optimize use of the club head in view of the user's particular swing characteristics.

It is also contemplated that in another embodiment, the mounting port and corresponding inserts are arcuate, with the mounting port being located along a periphery of the club head. Furthermore, the inserts may be customizable by including an insert body having a plurality of openings or recesses adapted to receive at least one sensor insert body and at least one mass insert body.

Generally, the concepts described herein relate to a golf club, although, these concepts can be applied to other devices in the sports industry that are played with mechanical devices/implements that are swung or controlled by the user, such as hockey, tennis, racquetball, baseball, lacrosse, etc.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A golf club customization system adapted for use with a golf club head having a mounting port formed therein, the golf club customization system comprising:
   a sensor insert having a sensor insert body and a sensor coupled to the sensor insert body, the sensor insert body being sized and configured to be removably insertable within the mounting port formed in the club head, the sensor being configured to generate operating data representative of a user swinging the club head;
   a first mass insert and a second mass insert that are sized and configured to be interchangeably inserted in the mounting port formed in the club head,
      the first mass insert having a first recess defining a first recess configuration such that, when the first mass insert is inserted in the mounting port, the golf club head comprises a first center of gravity location,
      the second mass insert having a second recess defining a second recess configuration that is different from the first recess configuration such that, when the second mass insert is inserted in the mounting port, the golf club head comprises a second center of gravity location that is different from the first center of gravity location; and
   a selector in operative communication with the sensor, the selector being configured, based on the operating data generated by the sensor and predetermined relationship information correlating the operating data with optimal center of gravity location, to select one of the mass inserts and select a mass insert orientation in the mounting port for the selected mass insert.

2. The system recited in claim 1, further comprising a display in operative communication with the selector and configured to display information associated with the selected one of the mass inserts.

3. The system recited in claim 2, wherein the display is a mobile communication device.

4. The system recited in claim 1, wherein each mass insert includes a mass body and a resilient cover extending over the mass body.

5. The system recited in claim 4, wherein each mass insert defines an elongate generally cylindrical configuration.

6. The system recited in claim 1, wherein the mass inserts are of different masses.

7. The system recited in claim 1, wherein the mass inserts have different mass distributions.

8. The system recited in claim 1, wherein each mass insert includes fastening elements formed at opposed ends of the respective mass insert to enable insertion of the respective mass insert into the mounting port in at least two different orientations.

9. The system recited in claim 8, further comprising a fastener configured to be engageable with the fastening elements of the mass inserts and the club head for securing the mass inserts individually within the club head.

* * * * *